May 28, 1957     J. W. TRAMEL     2,793,465

RODENT TRAP

Filed Aug. 4, 1955

Jess W. Tramel
*INVENTOR.*

BY *Clarence A. O'Brien
and Harvey B. Jacobson*
*Attorneys*

United States Patent Office 2,793,465
Patented May 28, 1957

2,793,465
RODENT TRAP

Jess W. Tramel, Grand Junction, Colo.

Application August 4, 1955, Serial No. 526,473

3 Claims. (Cl. 43—81)

The present invention relates to new and useful improvements in rodent traps of the spring actuated, swinging wire striker type particularly for rats, mice, etc., and has for its primary object to provide a trap of this character comprising a novel trigger mechanism for ensuring correct operation at all times.

Another very important object of the invention is to provide, in a manner as hereinafter set forth, a rodent trap of the aforementioned character which may be expeditiously set with maximum safety.

Other objects of the invention are to provide a rodent trap of the character described which will be comparatively simple in construction, strong, durable, compact and which may be manufactured at low cost.

Figure 1:
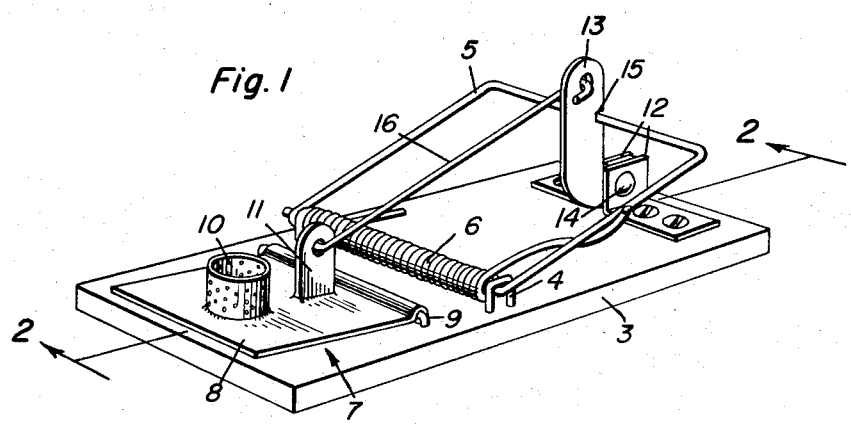
Figure 2:
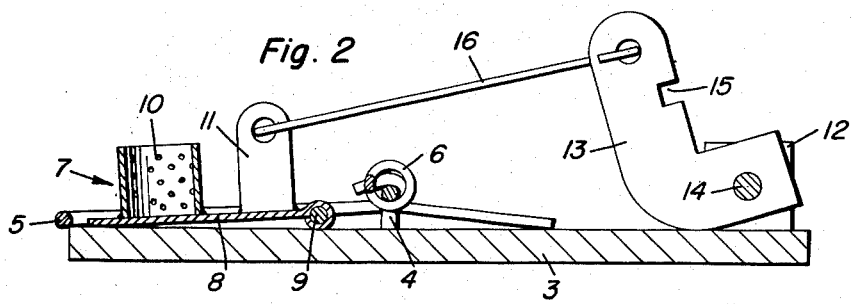

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a set trap constructed in accordance with the present invention; and Figure 2 is a view in vertical longitudinal section through the unset trap, taken substantially on the line 2—2 of Figure 1.

Referring now to the drawing in detail, it will be seen that the embodiment of the invention which has been illustrated comprises a substantially rectangular base 3 of suitable wood, which base may be of any desired dimensions. Pivotally secured, as indicated at 4, at an intermediate point on the base 3 is a vertically swingable wire striker 5. A coil spring 6 actuates the striker 5.

Mounted on the forward portion of the base 3 is a trigger which is designated generally by reference character 7. The trigger 7 includes a metallic plate 8 which is pivotally secured at 9 on the base 3 for swinging movement in a vertical plane. Rising from the plate 8 is a perforated metallic bait cup 10. Also rising from the plate 8, rearwardly of the bait cup 10 and adjacent the pivotal mounting 9 of said plate, is an apertured arm 11.

Mounted on the rear end portion of the base 3 is a pair of spaced, opposed upstanding metallic ears 12. An angular metallic catch 13 has one end portion pivotally secured between the ears 12, as indicated at 14. The substantially upstanding portion of the catch 13 is provided in its rear edge with a notch 15 for the reception of the free end portion of the striker 5. A link 16 in the form of a wire rod has its ends pivotally connected to the arm 11 and the free end portion of the catch 13. Thus, the trigger 7 is operatively connected to the catch 13.

It is thought that the operation of the trap will be readily apparent from a consideration of the foregoing. Briefly, suitable bait is placed in the perforated cup 10. The striker 5 is then swung upwardly and rearwardly against the tension of the spring 6, and the catch 13 is engaged therewith, the notch 15 receiving said striker. In this manner, the trigger 7 is swung upwardly and secured in elevated position. Also, the striker 5 is releasably secured in set position. A rodent, scenting the bait in the perforated cup 10, approaches the trap and steps on the plate 8. The plate 8 swings downwardly under the weight of the animal and, through the link 16, swings the catch 13 forwardly on its pivot 14 for releasing the striker 5 which, being actuated by the spring 6, smites the animal in an obvious manner.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A trap of the character described comprising: an elongated base, a spring actuated striker pivotally mounted at an intermediate point on the base for swinging movement in a vertical plane, a catch pivotally mounted for vertical swinging movement on one end portion of the base and engageable with the striker for releasably securing the same in set position, a trigger pivotally mounted for swinging movement in a vertical plane on the other end portion of the base, said trigger being animal actuated and including an upstanding arm, and a link having its ends pivotally anchored to said arm and to the catch for positively actuating the catch for releasing the striker when the trigger is actuated by an animal.

2. A trap of the character described comprising: an elongated base, a spring actuated striker pivotally mounted at an intermediate point on the base for vertical swinging movement, an animal actuated trigger pivotally mounted for vertical swinging movement on one end portion of the base, an angular catch pivotally mounted for vertical swinging movement on the other end portion of said base, said catch including a substantially flat, upstanding end portion comprising a rear edge having a notch therein at an intermediate point for the reception of the free end of the striker for releasably securinf said striker in set position, and a link having its ends pivotally anchored to the trigger and to the catch for retaining the trigger in raised position and for positively actuating the catch for disengaging said catch from the striker for releasing the same when said trigger is actuated by an animal.

3. A trap of the character described comprising: an elongated base, a spring actuated striker pivotally mounted at an intermediate point on the base for vertical swinging movement, an animal actuated trigger pivotally mounted on one end portion of the base for vertical swinging movement, said trigger including a plate having one end portion pivotally secured to the base, an apertured bait cup rising from the plate, an arm rising from said plate adjacent the pivotal mounting thereof, a catch pivotally mounted on the other end portion of the base and engageable with the striker for releasably securing the same in set position, and a link having its ends pivotally anchored to the arm and to the catch for operatively connecting the trigger to said catch for positively actuating the same for releasing the striker when said trigger is actuated by an animal.

References Cited in the file of this patent

UNITED STATES PATENTS

| | | |
|---|---|---|
| 1,464,559 | Britan | Aug. 14, 1923 |
| 1,537,038 | Dorakdjain | May 5, 1925 |
| 2,466,270 | Peterson | Apr. 5, 1949 |
| 2,517,928 | Richards | Aug. 8, 1950 |